May 5, 1959   R. M. HEINTZ   2,884,913
INTERNAL COMBUSTION ENGINE
Filed March 14, 1958   4 Sheets-Sheet 4

INVENTOR.
RALPH M. HEINTZ
BY
Lippincott, Smith & Ralls
ATTORNEYS

United States Patent Office 2,884,913
Patented May 5, 1959

2,884,913

INTERNAL COMBUSTION ENGINE

Ralph M. Heintz, Los Gatos, Calif.

Application March 14, 1958, Serial No. 721,588

14 Claims. (Cl. 123—28)

This invention relates to internal combustion engines and particularly such engines as are adapted for use as power plants for automotive vehicles, although it is also adapted to use with engines of other types and for other purposes, such as marine engines and stationary engines.

A vast majority of the internal combustion engines in use today, however, are for automotive use. The great majority of these, again, are employed in passenger cars. For this latter purpose, certain operating characteristics are necessary: the engine must have a high degree of flexibility both as to speed of operation and power output; it must idle smoothly at a relatively low speed; upon demand, it must accelerate rapidly under heavy load, instantaneously applied; it must operate continuously at high speeds under relatively light loads on fairly level ground or under heavy loads imposed by the climbing of steep hills; it should also be able to continue to operate smoothly under decelerations or upon sudden removal of a load.

These requirements have led to the almost universal use of the Otto cycle engine for passenger car purposes, although some diesel and semi-diesel engines are used for trucks or buses. The diesel engine is, however, essentially a heavy-load, low-speed engine that does not take kindly to rapid variations in either speed or load. Applied to passenger cars it will not meet the demands of the modern motorist, although its fuel economy has led to its use in heavier vehicles, operated by professional drivers who are ready to accept the constant change of gears imposed by lack of flexibility.

In order to attain the flexibility of the modern Otto cycle engine it has been necessary to accept a number of important disadvantages. The most important of these is the fact that the fuel supplied to it never undergoes complete combustion; in each power stroke of an engine of this type the oxygen of the air in the mixture is fully consumed, but the exhaust fumes carry a high percentage of the products of partial combustion. Practically all of these products are deleterious to health. The most important is the highly poisonous carbon monoxide; others are ketones and aldehydes which are powerful irritants. Recent studies have shown that the exhaust fumes of millions of automotive vehicles are probably a most important cause of the irritant components of what has variously been called "smog" and "industrial haze," the effects of which upon the respiratory tract, the eyes and other mucosa are an increasingly important problem in all urban communities.

There is evidence that as much as 25 percent of the energy available in the fuels supplied to automotive engines may be unconsumed and discharged in the exhaust. This is a principal reason for the relative low economy of the Otto cycle engine as compared with the diesel, especially when throttled. Characteristically, a diesel engine burns substantially all of its fuel but only approximately 80 percent of the available oxygen in the air supplied to it. While a diesel engine will sometimes emit large quantities of dense smoke, particularly when subjected to a sudden change of load, its exhaust fumes always contain a lower percentage of toxic agents than those of the Otto cycle engine.

The flexibility of the Otto cycle engine has been achieved at the expense of other disadvantages in addition to the primary one of incomplete combustion. To increase the efficiency, especially at part throttle, higher and higher compression ratios have been used. To avoid detonation or knocking under high compression has required special fuels containing additives contributing further to the toxic and irritant components in the exhaust, these including lead and bromine compounds derived from the additives rather than the fuel itself. Multiple jet carburetors are employed in order to secure the proper explosive mixtures throughout the wide range of throttle openings between idling and maximum power conditions. To this is added an accelerator pump that feeds in raw fuel at the instant of a sudden acceleration, further decreasing the economy of the engine. An elaborate manifolding system is required for supplying the mixture to the cylinders. Furthermore the speed and power are controlled primarily by throttling the air intake and hence, except under the condition of a wide-open throttle, the air within the cylinder at the beginning of the compression stroke is so rarified that the advantage of high compression is very largely lost.

A modern automobile, even one of the very heavy luxury cars, requires only from 20–30 horsepower to drive it on level ground at cruising speeds of, say 50–55 miles an hour. It is only to meet the relatively unusual demands of acceleration, for passing at high speed or for climbing steep hills without shift of gears, that the 200–350 horsepower now supplied in even moderately priced cars is required. The engine, however, must be designed to meet the maximum demands; in operating at lower powers it becomes more and more inefficient as the power demanded of it is reduced.

The primary object of the present invention is to provide an engine having the characteristics demanded by the public of the engines in their passenger vehicles, the exhaust fumes whereof are substantially free of poisonous or irritant constituents: i.e., free of carbon monoxide, ketones, aldehydes and lead and bromine compounds. While the primary object is thus the reduction of the health hazards resulting from the increasing use of motor vehicles, a necessary concomitant of this object is to provide an engine with higher efficiency than can be provided by the best Otto cycle engines, particularly at the lower powers demanded at cruising speeds of 70 miles per hour on level ground and below. Further objects are to provide an engine that is simpler and can be made at lower cost than present Otto cycle engines, avoiding the use of expensive carburetors and the like, and which may, therefore, be adopted with an immediate economic advantage, rather than a disadvantage to the purchaser, and to provide a means whereby pre-existing engines may be converted to the type of cycle employed by the engine of this invention at reasonable cost so that the owners of present cars can afford to make the conversion in view of the fuel savings attained in the remaining lives of their cars. As a corollary of this last, an object of the invention is to provide designs that may be adopted by the manufacturers of conventional types of engines without complete redesign of their existing power plants, its supports and auxiliaries. Other objects and various detailed advantages will become apparent in what follows.

In accordance with this invention the main body of the engine to which it is applied may conform substantially to standard practice with regard to the arrangement of its cylinders, pistons, connecting rods, crank shaft and intake and exhaust valves and their operative mechanism. In addition to these conventional elements there is added, for each cylinder, an auxiliary combustion chamber of relatively small volume as compared to that displaced by the piston within the cylinder, this combustion chamber being provided with an opening (or a plurality of openings) discharging into the cylinder above the piston, i.e., into the main combustion chamber. An air duct connects with the auxiliary chamber through a port which is closed by an intake valve that operates substantially synchronously with the main intake valve of the cylinder, usually opening and closing concurrently with the main valve, although under certain circumstances the timing of its opening, closing, or both, may differ from that of the main intake to some degree. A fuel duct opens into the air duct ahead of this valve; fuel is fed through this duct, timed or continuously, but in varying quantity, depending upon the immediate power demand upon the engine, collecting in the air duct behind the valve leading into the combustion chamber. One additional feature of the auxiliary combustion chamber that is advantageous, although not essential, is a "standpipe," a reentrant tube opening at one end into the main combustion chamber and extending through the auxiliary chamber to open, at its other end, in the neighborhood of the intake valve.

Preferably, particularly for automotive use, the fuel is supplied by a positive-displacement pump, driven by the engine and so proportioned that it will deliver into the fuel line the maximum amount of fuel that the engine can "digest" when delivering top power. The proportion of this maximum that reaches the engine is determined by a pressure-regulating fuel valve that by-passes the excess fuel above the immediate demand, back to the main fuel supply. With this arrangement the pressure required to open the bypass is regulated by the degree of compression of a spring which can be compressed to a greater or less degree by operation of the usual foot-throttle or its equivalent. The continuous supply of fuel is a convenient but not a necessary feature of the invention: any other system of feed that will supply a properly metered amount of fuel behind the intake valve, as or before it opens, will serve.

A spark plug projects into the auxiliary chamber with its gap quite closely adjacent to the inlet valve. It is supplied from a conventional ignition system. Usually, however, a somewhat greater spark advance than that customarily employed is advantageous.

The operation of this arrangement can best be understood from a consideration of the two extreme conditions, i.e., idling and full load. Under operating conditions there is preferably no constriction whatever in the main intake duct except that of the intake valve itself. On the intake stroke both the main valve and that into the auxiliary chamber open, the main valve admitting a full charge of air without an admixture of fuel. In a four-stroke cycle engine most of the total charge of fuel will have collected behind the auxiliary valve at the instant that it opens. This fuel is at once drawn into the chamber, followed by a lesser flow of the fuel supplied by the pump throughout the stroke. Because the flow through the auxiliary chamber is unidirectional, the intake port and the opening into the main chamber being at opposite ends, the mixture of fuel and air entering through the valve carries before it any burned gases remaining from a previous explosion. Under the conditions of minimum fuel supply during idling, some of the fuel may or may not escape into the main cylinder. In any event, the richest charge will be collected adjacent to the opening into the cylinder and the leanest adjacent to the spark plug. Because of the small volume of air in the combustion chamber, relative to that in the main cylinder, there will always be an excess of fuel over oxygen in this chamber. This charge is stratified, however, and the portion of it adjacent to the spark plug will be in explosive proportions.

At or near the end of the compression stroke the spark plug fires, igniting the upper portion of the mixture within the chamber and driving the remainder of the charge ahead of it into the highly compressed and therefore hot air within the cylinder. Spraying out through the openings into the cylinder the flame forms multiple "ignition points" which ignite any of the fuel that has escaped ahead of it. If there are enough ignition points and they are dispersed throughout the lean mixture this mixture will burn quickly enough to insure complete combustion before the exhaust valve opens. Because of the high temperature of the escaping gases and the large excess of air within the cylinder combustion in the latter goes to completion, even though a small quantity of unburned fuel will remain in the auxiliary chamber. This, however, will be scavanged and drawn into the cylinder on the next stroke to mix with freshly admitted air and be burned with the next charge.

One slight modification of the operation described may be employed with advantage, especially if the auxiliary chamber incorporates the reentrant tube mentioned above. On the compression stroke of the engine a portion of the air displaced by the piston is forced into the auxiliary chamber, entering in part through the fuel openings, in part through the reentrant tube, above the major portion of the fuel charge which is stratified below it. It is possible that this may result in a mixture adjacent to the spark plug that is too lean to ignite properly under the minimum fuel supply conditions desirable for low idling speeds. Under such circumstances some throttling of the main intake can profitably be used, to decrease the amount of air in the stratum near the spark plug and so enrich the mixture to insure proper ignition, and also to reduce the roughness resulting from air compression. The throttling should be used only at idling and minimum-power operation, and should be of small degree as compared to that employed in conventional engines, i.e., the vacuum resulting should not exceed 4 or 5 inches of mercury as compared to 15 inches or so. At maximum throttling there should still be a large excess of air over that of a stoichiometric mixture.

Under maximum road conditions a considerably greater charge of fuel collects above the intake valve into the auxiliary combustion chamber, more than would burn were it uniformly mixed with the admitted air. Such uniform admixture does not occur, however. The charge stratifies as before, the greater portion of the admitted fuel being drawn to the bottom of the chamber ahead of the incoming air. The last air admitted is mixed only with the concurrently admitted fuel, and this in explosive proportions, with the explosive mixture at the top, adjacent to the spark plug. When firing occurs the flame propagates downward, driving the heavier, non-explosive charge before it and spraying it into the hot, highly compressed air in the cylinder. The first portion of the charge to enter the cylinder may enter without igniting, but the compression ratio employed is normally sufficient to raise the temperature to the ignition point of the fuel, as in the diesel cycle, and this is followed by a spray of burning "ignition points" each of which forms a center of combustion from which the flame propagates throughout the cylinder and at high velocity. Because of the multiple points of ignition the flame propagates much more rapidly than it otherwise would; the engine is capable of operating at as high speeds as have become customary in ordinary motor car practice. The explosition takes place, however, without detonation, and in ceretain applications even with ordinary white gasoline, untreated with "anti-knock" compounds.

It is under maximum power conditions that the reentrant tube construction has its greatest value, insuring the stratification of the charge with a lean mixture in the valve-spark plug region of the auxiliary combustion chamber. Combustion in this region results in a highly oxidizing flame that keeps the plug and valve clear of carbon. Without the reentrant tube, long operation under heavy loads produces fouling, which the reentrant tube prevents.

At intermediate loads the two types of operation that have been described above merge gradually, one into the other. The greatest advantage of the engine over prior art devices is that except during the brief periods when maximum power is demanded and the accelerator pushed down to the floor there is always an excess of air present to burn the fuel completely. During the brief intervals when maximum power is demanded, the burning may be no more complete than in the usual Otto cycle engine, but exhaust gas analyses show that during normal operation the unburned constituents are reduced by a considerable factor and exhaust gases from the tail-pipe contain a lower percentage of carbon monoxide than that normally considered dangerous. This is particularly true of the idling condition, under which combustion of the ordinary Otto cycle engine is especially poor and as a result of which many deaths have taken place from carbon monoxide poisoning in closed garages. In idling and at low outputs, the engine operates more like an exterenal combustion one, for all, or nearly all, of the combustion takes place in the auxiliary chamber.

In addition, the complete burning of the fuel results in a saving in cost of operation that will directly follow this completeness of combustion. Not only is the complete burning itself the equivalent of extra gallons of fuel, but because the cylinder always receives a full charge of air, full advantage is taken of the high compression ratio of the engine as well as the higher mechanical efficiency which results from the lowered pumping losses.

In addition to the advantages described above, the engine consumes less lubricating oil; the low vacuum resulting from the normally wide-open air intake does not draw as much oil past the piston rings to burn (and cause smoke) or otherwise be wasted. On the other hand, unburned gasoline is never present in the cylinder to be forced past the rings on the compression stroke and dilute the crankcase oil. Moreover, no deposit of carbon occurs in the main combustion chamber. If any carbon does collect during periods of maximum power output, it is promptly burned out as soon as normal operation is resumed and the atmosphere within the cylinder becomes an oxidizing one.

A detailed description of one embodiment of the invention and further explanation of the details of its operation which follow are illustrated by the accompanying drawings, wherein.

Figure 1:
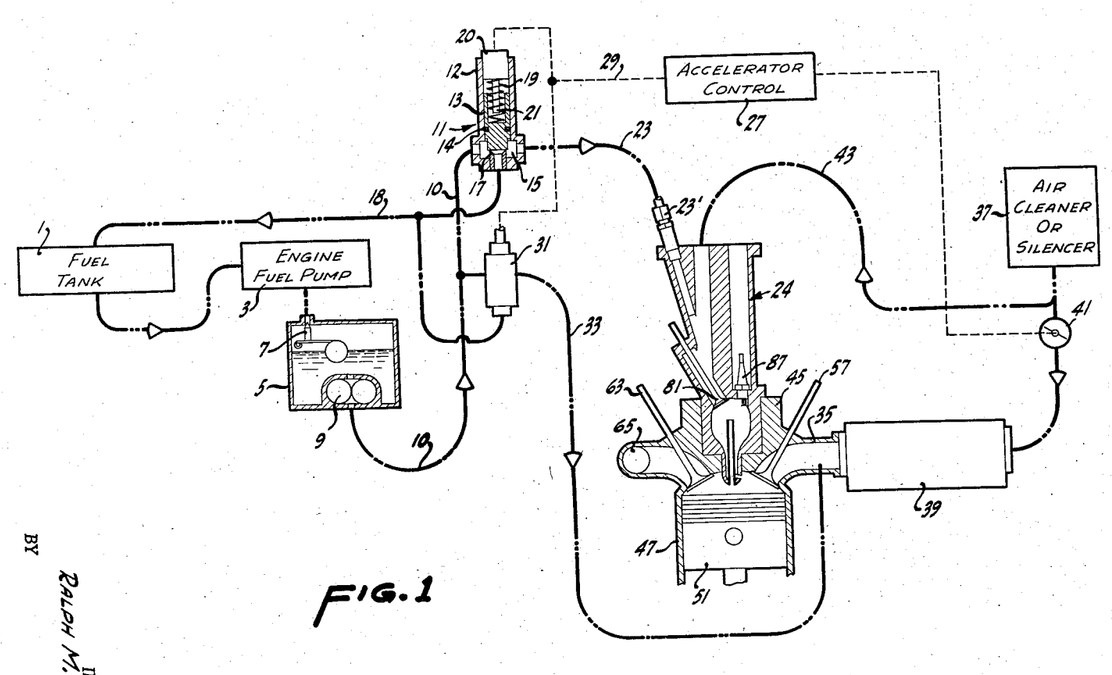
Fig. 1 is a diagrammatic illustration of the fuel and air induction system of an engine embodying the invention, the engine itself being symbolized by a simplified sectional view of one cylinder, including its cylinder head, the auxiliary combustion chamber, and its appurtenances.

The schematic drawing of Fig. 1 shows the complete fuel and air system for an automotive engine embodying the present invention. Taking first the fuel supply, the gasoline or other fuel is drawn from the fuel tank 1 by the usual engine fuel pump 3, similar to that used in present engines to supply fuel to the carburetor bowl. The fuel and air lines are indicated by the heavy dot-dash lines, with the direction of flow indicated by arrows.

The pump 3 feeds the fuel to a pump reservoir 5, within which a conventional float-valve 7 maintains the level substantially constant. Located in the bottom of the pump reservoir is a positive-displacement pump, preferably of a rotary type and indicated as a gear-pump 9. This pump is positively driven from the engine at a speed proportional to the engine speed and therefore supplies a constant quantity of fuel per engine stroke to the fuel or accelerator valve 11.

The fuel pump 9 is designed to deliver the maximum amount of fuel that can be utilized by the engine at full power. The valve 11 limits the amount of this flow to that required by the immediate load. While it could take numerous forms, that illustrated comprises a cylinder 12 within which slides a plunger 13, sealed against leakage by an O ring 14. The cylinder terminates in a valve chamber 15, into which the line 10 from the pump is connected. In the bottom of the valve chamber is a valve-seat 17. The flat face of the plunger bears against the valve-seat which connects to a fuel-bypass line 18 leading back to either the main fuel tank 1 or the pump reservoir as may be preferred.

The plunger 13 is forced against the valve seat by a compression spring 19 with a pressure that is variable by means of an operating-plunger 20, that is actuated by the accelerator pedal of the car, either directly or through a suitable mechanical linkage. An extension pin 21 extends through the spring to bear directly against the bottom of the plunger and seal the valve positively when the accelerator is fully depressed.

A suitable material for both plunger 13 and valve-seat 17 is nylon. It is not attacked by any of the ordinary fuels, it does not stick when lubricated even by gasoline, and it has sufficient "give" to make a tight seal.

In the diagrammatic showing of the figure only a single fuel line 23 connecting from the valve chamber 15 to supply a single cylinder is shown, the supply for multi-cylinder engines beyond the valve 11 being merely duplications. It is important, however, that the fuel passing through the valve be uniformly distributed between the cylinders and to this end it is desirable that the multiple lines 23 to the individual cylinders be made as nearly uniform as possible in length and capacity. Furthermore, the lines into each of the cylinders are provided with metering orifices 23' (which may or may not be spray nozzles) of uniform diameter and length so that the amount passed through each is equal and substantially proportional to the pressure tending to force the fuel through the lines. The minimum amount is adjustable by a stop for idling while the maximum amount is not in excess of that which the engine can "digest" with the pressure regulator valve closed, which it is in the "full out" condition. Each line 23 supplies an auxiliary combustion chamber assembly 24 as will be described in detail below.

The valve 11 is therefore a pressure-regulating valve. The plunger 13 is held against its seat by the spring 19 as long as the force of the spring exceeds the vertical component of pressure exerted by the fluid within the valve upon its face. It then rises from the seat, permitting enough fuel to pass into the return line 18 to maintain the pressure within the valve-body constant. The accelerator control 27 merely varies the compression on the spring 19 and therefore the pressure in the valve chamber 15 and the flow of fuel to the engine. The mechanical control of pressure is indicated by the dotted line 29.

For completeness there is also shown a branch fuel line to a second fuel valve 31, which may be similar in construction to valve 11 but is so set that it does not open until the pressure approaches that required for maximum power output. Output line 33 leads directly to the main air intake 35 of the engine, thus discharging a portion of the fuel into this line. As will be described later, this discharge may be either in spray or solid stream form.

Air for the engine is drawn through a conventional air cleaner or silencer 37, which is preferably mounted in immediate proximity to a common air chamber or simple manifold 39 that supplies all cylinders of the engine and that connects with the intake ducts 35 of the various cylinders by as short and direct paths as possible. As far as the operation of the engine itself is concerned, it is preferable that no constriction be inserted anywhere in the air line between the air cleaner and the intake duct except when idling. Many automobiles, however, are equipped with auxiliaries that are operated by the vacuum drawn by the engine on its suction stroke and of these the most important are the power brakes. In normal operation the present engine draws only the minimum vacuum imposed by the friction head through the air cleaner and the intake manifold and ducts. In order to supply a vacuum when one is necessary, a butterfly valve 41 may be inserted in the intake line. This valve is normally wide open and it is arranged so that it will partly close either upon the sudden release of the accelerator pedal or upon the application of the brake pedal, to provide the vacuum necessary for the operation of the brakes, and for greater dynamic braking by the engine and smoother idling. Basically, the engine can be operated under all conditions without throttling its air intake. Throttling is really necessary only to operate auxiliaries that have nothing to do with the operation of the engine per se, although it may be desirable to achieve slower and smoother idling. It is considered sufficient to indicate that an air throttle can be used and to give generally the conditions where it is applicable, without detailed description.

In addition to the regular intake duct 35, a small auxilary air duct, indicated schematically by the line 43, leads into the combustion chamber assembly 24, within which it is joined by the fuel supply from the fuel line 23. Duct 43 may connect to the main air line between filter 37 and valve 41 as shown, or to a separate filter as may be convenient; preferably, of course, its intake air is filtered.

A combustion chamber assembly 24 is mounted on the head 45 of each cylinder 47 of the engine. Fig. 1 shows these parts only in much simplified sketch: they are shown in greater detail and the arrangement can be better appreciated from Fig. 2. This latter figure shows, in section, only the upper portion of the cylinder and cylinder head of one cylinder of a V–8 engine, it being considered unnecessary to show the lower portion of such engine, as it may be identical with any standard automotive engine of this general type.

The cylinder 47 is surrounded by the usual cooling water jacket 49. Reciprocating within the cylinder is the piston 51 of standard, trunk type. The piston differs—if at all—from that of the usual engine only in the shape of the piston head 53, which is slightly domed to match, at one side, the contour of the domed cylinder head but slopes downward toward the cylinder wall and toward the viewer in Fig. 2 as indicated in Fig. 3. Other contours are possible but the one shown is convenient.

The cylinder head itself is bolted to the cylinder block in the usual manner. Like the cylinder it is water cooled, being provided with channels 55 for the circulation of cooling water. Air duct 35, leading from the manifold 39, passes through these channels and terminates in the intake valve 57, which is operated in the usual manner by a push rod 59 through a rocker-arm 61 that bears upon the valve stem. The arrangement of exhaust valve 63, which closes the passage from the cylinder to exhaust pipe 65, is generally similar, it being operated by push rod 69 through rocker-arm 71. Both push rods are operated from the engine cam shaft in customary fashion and their timing generally need be no different from that used in an Otto cycle engine. The general location of valves 57 and 63 in the cylinder head on opposite sides of the cylinder is best indicated in Fig. 4.

The lower end of the combustion chamber assembly 24 is cylindrical and fits into a matching cup or receptacle 73 that is formed within the cylinder head and surrounded and cooled by the water jacket. The auxiliary combustion chamber proper is formed of two main parts 75 and 79 that mate to form a chamber of generally pear-like shape, domed at the top and tapering toward the bottom. The lower portion 75 is provided with a "nose" 76 that projects through the wall of the cylinder head into the cylinder at a location which, for illustration, is shown as between but somewhat to one side of the intake and exhaust valves as is indicated in Fig. 4, substantially in the position that would be occupied by the spark plug of a conventional engine. Within the cylinder the nose is provided with one or more apertures through which the ignited fuel is injected into the cylinder. The form of the opening or openings is not too important.

Figure 2:
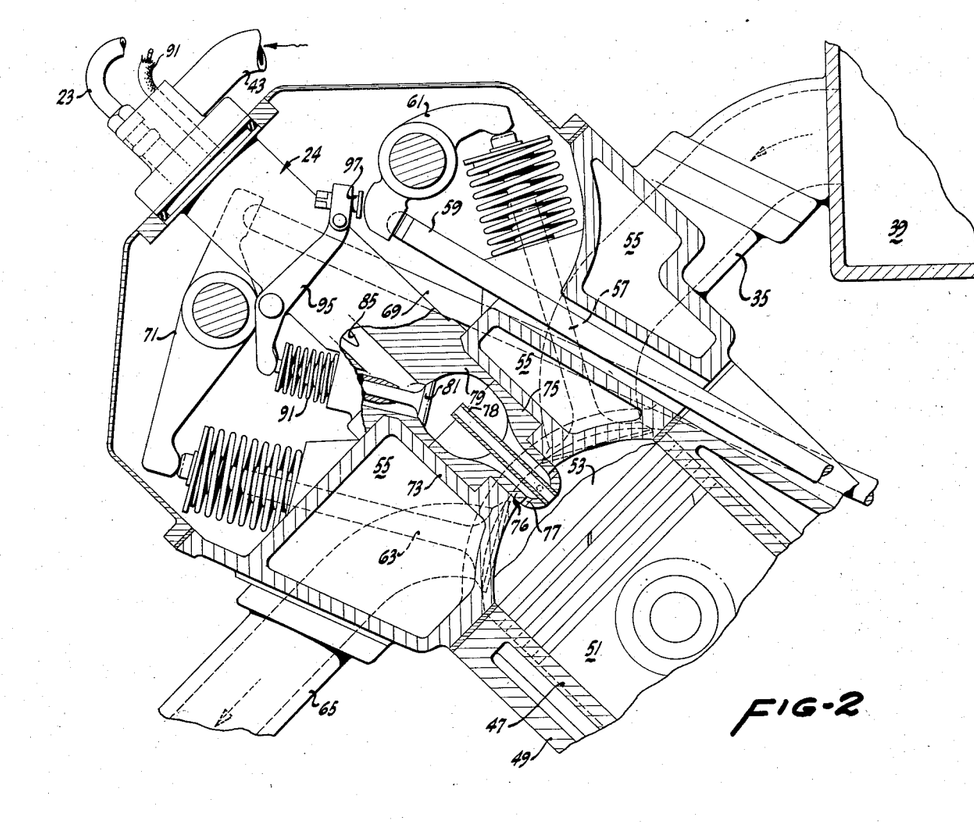
Fig. 2 is a detailed sectional drawing of the portion of the engine shown simplified in Fig. 1, including the valve operating mechanisms.
Figures 3, 4, 6, 7:
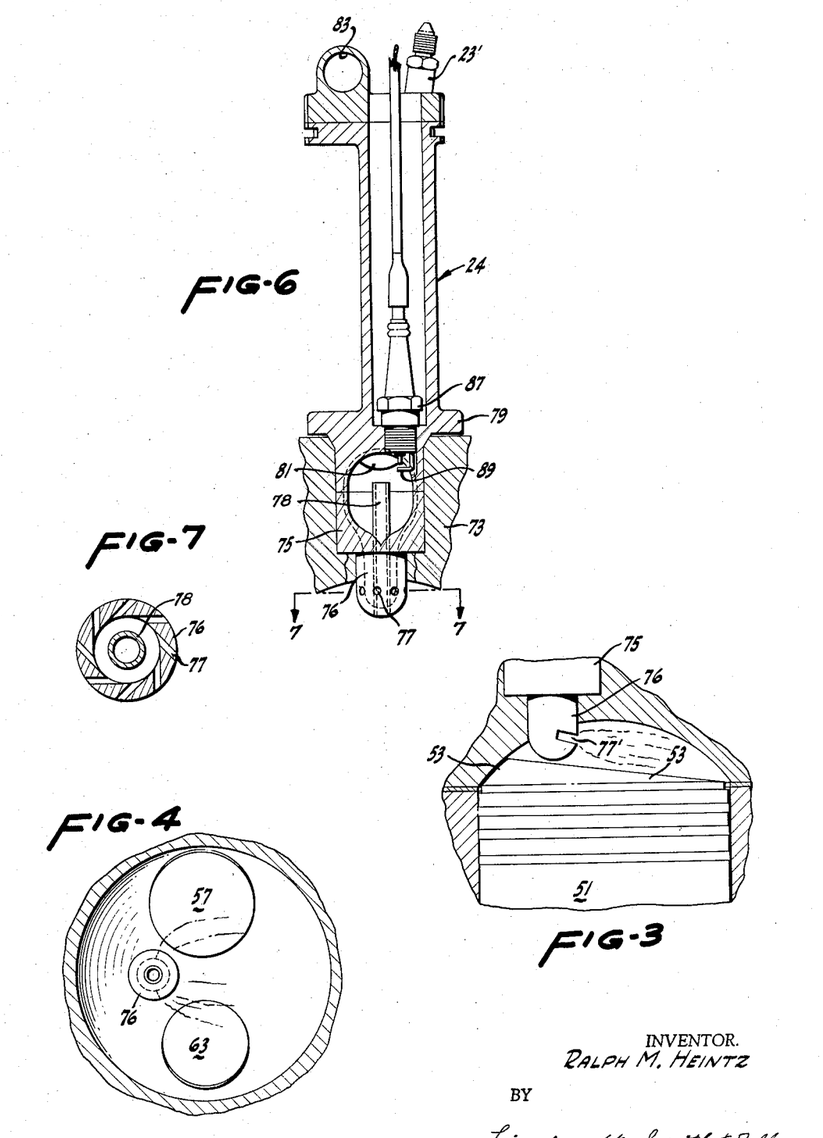
Fig. 3 is a fragmentary view of the upper portion of the cylinder, cylinder head and piston at top dead-center, illustrating the relationship of the combustion chamber to the cylinder and piston, and showing an alternative form of discharge opening, this view being taken in a plane normal to that of Fig. 2.
Fig. 4 is a view of the cylinder head as viewed from within the cylinder, showing the position of intake and exhaust valves with relation to the combustion chamber openings.
Fig. 6 is a vertical sectional view through a combustion chamber assembly, showing one arrangement of discharge openings, the plane of section being indicated by the lines 6—6 of Fig. 5.
Fig. 7 is a transverse section through the combustion chamber of Fig. 6 taken in the plane of the discharge openings to show their non-radial arrangement.

In Figs. 2, 6 and 7 the openings 77 are holes drilled through the nose of the chamber so as to enter its contracted end approximately tangentially. Those discharging on the side of the nose farthest from the cylinder wall are preferably made larger than those discharging into the opposite direction, the effort being to secure as even a distribution of the burning gases ejected into the main combustion chamber as possible. The tangential holes set up a swirl within the main combustion chamber that aids in distributing the ignition points. Radial holes, however, are fully operative.

The auxiliary chamber shown in these Figs. 2, 6 and 7 embodies the additional feature of a reentrant tube 78, rising from the end of the nose through the axis of the chamber to a point somewhat above the junction between the lower part 75 of the assembly body with its upper portion 79. The reentrant tube shown is a Nichrome tube, ¼ inch outside diameter, 3/16 inch inside diameter. Other heat and oxidation resistant refractories could be employed. The tip of the reentrant tube is subjected to a highly oxidizing flame, however, and the material chosen should be able to withstand this.

The purpose of the reentrant tube has already been touched upon, as well as the fact that it is not a necessary feature. From the structure of the auxiliary chamber it will be seen, however, that on compression air entering the openings 77 will tend to follow the tapered walls upward through the rich charge at the bottom of the chamber and carry it to the vicinity of the intake valve and spark plug. The reentrant tube carries a current of substantially fuel-free air to the top of the chamber, where it meets the rising flow through the openings 77 and tends to "hold it down," thus improving stratification of the charge and insuring a lean, oxidizing mixture that cleans instead of fouls the spark plug when firing occurs.

Figure 8:
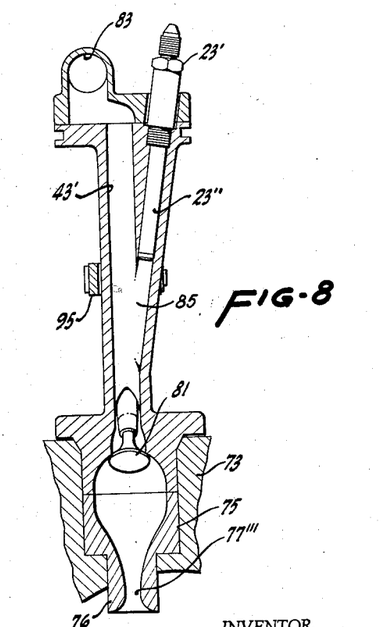
Fig. 8 is another vertical sectional view of a combustion chamber assembly taken on a plane parallel to that of Fig. 6 and indicated by the line 8—8 of Fig. 5, this figure showing a different arrangement of discharge opening in a structure otherwise identical with Fig. 6.
Figure 9:
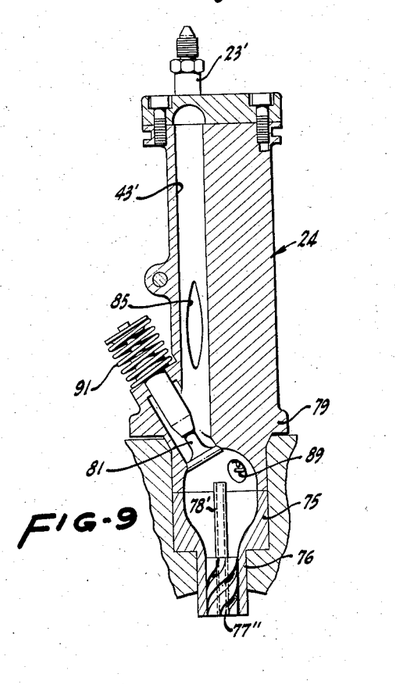
Fig. 9 is also a vertical sectional view of this assembly taken on a plane at right angles of that of Figs. 6 and 7 and indicated by the lines 9—9 of Fig. 5, this figure showing a still different arrangement of the discharge openings.

Alternative arrangements of openings are illustrated in the noses of the chambers shown in Figs. 3, 8 and 9. In Fig. 3 the opening 77' is in the form of simple slit, no reentrant tube being used. In Fig. 9 a helical septum, similar in form to a screw auger and terminating in openings 77", is shown with a reentrant tube 78' rising through the central bore. In Fig. 8 the opening 77''' is in the form of a single venturi nozzle, without a reentrant tube.

The various forms shown are suitable for use in cylinder heads of various types. That shown in Fig. 8, however, should not be used in a position wherein the jet from the opening impinges directly on an aluminum piston head, for the hot ejected gases can melt and even burn the aluminum. Directed laterally against the walls of the cylinder or cylinder head it is, in theory at least, the most efficient form, except under maximum load conditions where carbon deposit occurs in the spark plug region. Carbon deposit elsewhere in the auxiliary chamber causes no trouble; if it tends to form at all it is blown out into the main combustion chamber and consumed.

Figure 5:
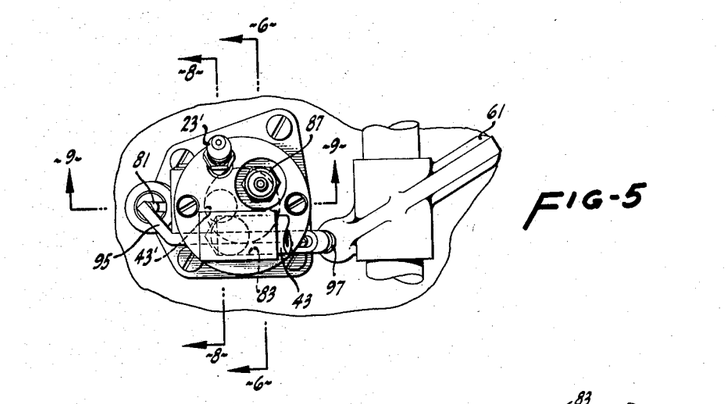
Fig. 5 is a plan view of the combustion chamber assembly.

The portion 79 of the assembly body in which the upper half of the combustion chamber is formed is cylindrical at its lower end, to fit within the receptacle 73 and mate with the portion 75 to form the chamber. A gasket, not shown, may be inserted between the two portions to seal the joint to make the chamber gas-tight. Above the cylinder head proper the assembly body is shaped to enclose the various ducts that carry the parts next to be described. Their arrangement is best shown by the plan view of Fig. 5 and the sectional views, on various planes, of Figs. 6, 8 and 9. It should be noted that throughout this specification "upper," "above," and the like refer to the direction away from the crankshaft of the engine, irrespective of the posture of the engine itself.

The air duct 43' extends directly down through the body portion 79 of the assembly to the combustion chamber, into which it opens through a poppet valve 81, generally at the top of the chamber, as shown in Figs. 8 and 9. The air duct 43' is a continuation of the duct 43 shown, schematically, in Fig. 1 to which it connects through a fitting 83. The fuel duct 23" enters the air duct at a slant through a port 85 (Figs. 8 and 9), discharging the fuel behind the valve 81.

The operation of the engine thus described has already been explained, in general, with the exception of the auxiliary injection of the fuel directly into the air intake duct 35. Such auxiliary fuel supply may or may not be necessary or desirable, depending upon the specific duty required of the engine to which the invention is applied. It is of course desirable to keep the auxiliary combustion chamber relatively small in order to attain as high a compression ratio as possible within reasonable limits. In order to obtain the maximum power of which a specific engine is capable it could require so much fuel that even with a stratified charge the mixture adjacent the spark plug would be too rich to explode. If this is the case the excess can be injected into the main inlet port and drawn into the cylinder with the main air on the suction stroke. Here it is ignited by the multiplicity of ignition points from the auxiliary chamber discharge, just as is any raw fuel escaping from the auxiliary combustion chamber before ignition occurs. As long as the air is in excess and there are enough ignition points strategically placed it will be completely consumed. The point where fuel supply to the main intake should begin is also a matter of individual engine design. It can be made to occur at fairly moderate powers or it can be kept in reserve for maximum demand only. Its use permits quantities of fuel to be burned which, if fed to the auxiliary combustion chamber, would render the mixture too slow-burning to be completely burned during the power stroke.

As the amount of fuel supplied to the engine is increased to an amount well above that required for normal driving, a point is eventually reached where its combustion becomes no better than in the conventional Otto cycle engine, which it actually becomes in the full power condition. At these extreme demands the poisonous products of incomplete combustion are discharged in the exhaust in the same manner as in the conventional engine. Clearly it is possible to regulate the fuel feed so that its maximum is below the incomplete combustion point but because the demand for maximum power occurs during so small a percentage of the time in which a car is driven, the engineering compromise will, in general, be to permit incomplete combustion to occur during, but only during the intervals of maximum power demands.

The way in which the fuel is admitted to the main intake duct when this form of injection is used is not of material importance. It may be injected as a spray (which is theroetically preferable) or it may be injected as a solid stream or even be permitted simply to dribble into the duct. Experience has shown that in any event it is carried into the cylinder with the rush of air that follows the opening of the intake valve and does not collect in the duct. Entering with the air and striking against the valve head in passing through the valve it is probably atomized to a sufficient degree to insure combustion. The force of the explosion in the auxiliary chamber is sufficient to break up the excess fuel as it is blown into the main combustion chamber to insure its burning.

Mention has been made of the fact that pre-existent engines may be modified to operate in accordance with the invention. The drawings accompanying this specification are those of an engine of the type to which the invention was first applied. This was itself a modification of a standard and widely sold commercial engine which was changed only, so far as the engine itself was concerned, by boring out the spark plug opening to form the receptacle for the combustion chamber assembly and the addition of spring 91 and rocker arm 95 to operate the combustion chamber valve. As illustrated in Fig. 2, an adjustable part 97 carried by arm 95 rides upon arm 61 so that valves 57 and 81 are operated together. The original intake manifold with its elaborate convolutions was discarded and so was the carburetor. The former was replaced by the simpler manifold or chamber 39, the latter by fuel pump chamber 5 and fuel pump 9. The auxiliary combustion chamber was, of course, added.

Such changes as these can, of course, be made at but a small fraction of the cost of a new engine. Even for private drivers the saving of fuel may make such a change economically attractive. Not only is there a saving in total fuel consumption but the ability to use ordinary white gasoline can effect a material saving in the cost of fuel consumed. For commercial vehicles, particularly taxicabs, a conversion will almost always prove economically advantageous, the cost of such a conversion being more than covered by the fuel expenditure during a single year. The decrease in air polution comes as a bonus; in urban areas taxicabs and other vehicles are a major contributor to air pollution and smog.

In the case of new cars, the advantage is even more apparent. The fuel system is much simpler and less expensive than the intake manifold and carburetor which it replaces. In a V-8 engine the chamber 39 can be mounted between the cylinders in the space previously occupied by the intake manifold and the air cleaner mounted immediately above it, replacing the towering structure of manifold, carburetor and air cleaner at the top. This would permit lowering of the hood and better road visibility.

One valuable feature of the invention is the fact that nothing occurs comparable to carburetor flooding, or stalling when, after a stop, the accelerator is suddenly depressed. When the intake valve to the chamber is opened on the suction stroke the first effect is a complete scavenging of anything that may have remained in the chamber following the preceding operation. When the suction stroke is completed the charge within the chamber is that for which it was designed and it catches on the first spark. In one experiment the ignition to one cylinder was completely cut off while the engine was operated on the remaining seven cylinders at full throttle, thus drawing unburned fuel into the cylinder at each stroke. When the ignition circuit was again completed after operation in this manner for some time the newly excited cylinder caught on the first spark and operated thereafter in normal fashion without choking or stalling, such as would ordinarily occur under like conditions with a carburetor-charged engine.

The invention has been described as applied to a most usual four-stroke-cycle type of engine. Although in a two-stroke cycle engine, the steps of intake, compression, explosion and exhaust are accomplished in a somewhat different manner and by a different mechanism than in the four-stroke-cycle engine, each of these steps is performed. This being the case it is obviously possible to utilize, in a two-stroke cycle, an auxiliary combustion chamber operated substantially as described, but in this case it may be desirable to substitute a piston or sleeve valve for the poppet valve 81.

Moreover, it is not necessary that the fuel used be gasoline, or even that it be liquid. For example, propane, butane, or natural gas injected into the air duct behind the intake valve as in the case with the liquid fuel will mix with the air as it is admitted, stratify and fire as will a gasoline mixture, provided enough (6% to 12%) liquid fuel is added to institute enough ignition points to effect complete combustion.

The detailed description of the particular engine shown is therefore not intended to limit the scope of the invention, all intended limitations being specifically set forth in the claims that follow.

What is claimed is:

1. Means for supplying a combustible mixture to an internal combustion engine having a cylinder and a piston reciprocably mounted therein and provided with principal intake valve means opening to admit air to said cylinder on one stroke per cycle of the operation of said piston, comprising an auxiliary combustion chamber having a discharge opening into said cylinder above the uppermost position of said piston therein, an air duct leading into said chamber, an auxiliary intake valve at the junction of said duct and said chamber, means for operating said auxiliary intake valve synchronously with said principal intake valve means, means for continuously feeding fuel into said air duct adjacent to said auxiliary intake valve, and a spark plug mounted substantially in the top of said chamber.

2. In combination with an internal combustion engine wherein a piston reciprocates within a cylinder provided with a main air intake valve which opens during one stroke of the cycle of operation of said engine; an auxiliary combuston chamber of relatvely small volume as compared to that displaced by said piston and having an opening into said cylinder above the head of said piston, an air duct opening into said chamber substantially opposite to said opening, an auxiliary intake valve in the junction of said duct with said chamber, means for open- and closing said auxiliary intake valve substantially concurrently with the opening and closing of said main intake valve, means for supplying a continuous flow of fuel into said duct, said fuel accumulating at said auxiliary intake valve and being drawn into said chamber upon the opening of that valve, and a spark plug projecting into said chamber adjacent to said auxiliary intake valve.

3. In combination with an internal combustion engine wherein a piston reciprocates within a cylinder provided with a main air intake valve which opens during one stroke of the cycle of operation of said engine; an auxiliary combustion chamber of relatively small volume as compared to that displaced by said piston and having an opening into said cylinder above the head of said piston, an air duct opening into the side of said chamber substantially opposite to said opening, a valve in the junction of said duct with said chamber, means for opening and closing the last-mentioned valve substantially concurrently with the opening and closing of said main valve, means comprising a positive-displacement pump operating at a constant ratio to the speed of said engine for supplying a flow of fuel into said duct, and a spark plug projecting into said chamber adjacent to said valve in the junction of said duct with said chamber.

4. In combination with an internal combustion engine wherein a piston reciprocates within a cylinder provided with a main air-intake valve which opens into a main combustion chamber above said piston during one stroke of the cycle of operation of said engine: an auxiliary combustion chamber of relatively small volume as compared to that displaced by said piston, said auxiliary combustion chamber having a nose projecting into said main combustion chamber and provided with at least one opening connecting said main and said auxiliary combustion chamber, an air-duct opening into said auxiliary combustion chamber substantially opposite to said nose, an inlet valve positioned at the junction of said air-duct and said auxiliary combustion chamber, a fuel-line connecting into said air-duct, a spark plug having a gap positioned in said auxiliary combustion chamber adjacent to said inlet valve, means for actuating said inlet valve synchronously with said main air intake valve, and means for injecting air from said cylinder into said auxiliary combustion chamber at a position adjacent to said spark gap.

5. In combination with an internal combustion engine wherein a piston reciprocates within a cylinder provided with a main air-intake valve which opens into a main combustion chamber above said piston during one stroke of the cycle of operation of said engine; an auxiliary combustion chamber of relatively small volume as compared to that displaced by said piston, said auxiliary combustion chamber being provided with a nose projecting into said main combustion chamber and having at least one opening therein connecting said main and said auxiliary combustion chambers, an air-duct opening into said auxiliary combustion chamber substantially opposite to said nose, an inlet valve positioned at the junction of said air duct and said auxiliary combustion chamber, a fuel line connecting into said air-duct, a spark plug having a gap positioned in said auxiliary combustion chamber adjacent to said inlet valve, means for actuating said inlet valve synchronously with said main air intake valve, and a reentrant tube within said auxiliary combustion chamber opening at one end into said main combustion chamber and at the other end adjacent to said spark gap.

6. In combination with an internal combustion engine wherein a piston reciprocates within a cylinder provided with a main air-intake valve which opens into a main combustion chamber above said cylinder during one stroke of the cycle of operation of said engine: an auxiliary combustion chamber of substantially pear-shaped contour, the small end whereof projects into said main combustion chamber and has at least one opening therein connecting into said main combustion chamber, an air-duct connecting into the larger end of said auxiliary combustion chamber, an inlet valve at the junction of said duct and said auxiliary combustion chamber, means for opening and closing said inlet valve synchronously with the opening and closing of said main air-intake valve, a spark plug having a spark gap positioned in the larger end of said auxiliary combustion chamber, means for supplying a continuous flow of fuel into said air duct and means for varying the amount of fuel so supplied.

7. The combination as defined in claim 6 wherein said fuel supplying and varying means comprise a positive displacement fuel pump driven by said engine, a fuel line connecting from said pump to said air duct, a pressure regulating valve in said fuel line, and means for varying the pressures delivered through said valve to vary the amount of fuel supplied to said air duct therethrough.

8. The combination as defined in claim 7 including a branch fuel line supplied by said positive displacement pump and connected to said cylinder through said main air intake valve, and a second pressure regulating valve in said branch fuel line adapted to open when the pressure therein exceeds a fixed value.

9. In combination with an internal combustion engine wherein a piston reciprocates within a cylinder provided with a main air intake valve which opens into a main combustion chamber above said piston during one stroke of the cycle of operation of said engine: an auxiliary combustion chamber of relatively small volume as compared to that displaced by said piston, said auxiliary combustion chamber having a nose projecting into said main combustion chamber and provided with a plurality of passages connecting said main and auxiliary combustion chambers and oriented at different angles to the nose of said auxiliary chamber to impart a swirling motion to gases ejected from said auxiliary chamber, an air-duct opening into said auxiliary combustion chamber substantially opposite to said nose, an inlet valve positioned at the junction of said air-duct and said auxiliary combustion chamber, a fuel-line connecting into said air-duct, a spark plug having a gap positioned in said auxiliary combustion chamber adjacent to said inlet valve, means for actuating said inlet valve synchronously with said main air intake valve, and means for injecting air from said cylinder into said auxiliary combustion chamber at a position adjacent to said spark gap.

10. The combination defined in claim 9 wherein said plurality of passages connecting said main and auxiliary chambers are apertures entering said nose substantially tangential to the portion of said auxiliary chamber therein.

11. In an internal combustion engine wherein a piston reciprocates within a cylinder, the combination of a principal air-intake valve opening directly into said cylinder, an auxiliary combustion chamber opening into said cylinder, an auxiliary air-intake valve opening into said auxiliary combustion chamber, igniting means in said chamber adjacent to said auxiliary valve, means for opening said principal and auxiliary intake valves substantially concurrently during the intake stroke of each operating cycle of the engine, and means for admitting fuel to said auxiliary chamber upon and principally at the initial opening in each cycle of said auxiliary valve, whereby the charge of fuel and air in said auxiliary chamber is stratified and an explodable mixture is formed adjacent to said igniting means irrespective of wide variations in total fuel intake to total air intake.

12. In an internal combustion engine wherein a piston reciprocates within a cylinder, the combination of a principal air-intake valve opening directly into said cylinder, an auxiliary combustion chamber opening into said cylinder, an auxiliary air-intake valve opening into said auxiliary combustion chamber, igniting means in said chamber adjacent to said auxiliary valve, means for opening said principal and auxiliary intake valves substantially concurrently during the intake stroke of each operating cycle of the engine, means defining a fuel-accumulating space adjacent to said auxiliary valve and on the opposite side thereof from said chamber, so that fuel accumulated in said space is drawn into said auxiliary chamber promptly upon the initial opening in each cycle of said auxiliary valve, and means for providing a regulated continuous flow of fuel into said accumulating space.

13. In an internal combustion engine wherein a piston reciprocates within a cylinder, the combination of a principal air-intake valve opening directly into said cylinder, an auxiliary combustion chamber opening into said cylinder, an air inlet duct opening into said auxiliary chamber, an auxiliary intake valve in the junction of said duct with said chamber, igniting means in said chamber adjacent to said auxiliary valve, means for opening said principal and auxiliary intake valves substantially concurrently during the intake stroke of each operating cycle of the engine, a fuel-metering orifice opening into said duct, means for supplying fuel under continuous pressure to said orifice so that there is a continuous, regulated flow of fluid through said orifice into said duct, and means for varying said pressure to control the power output of the engine.

14. In a multi-cylinder, reciprocating-piston engine having a plurality of combustion chambers, the combination comprising a separate air-intake valve opening into each of said combustion chambers, a separate air-intake duct leading to each of said intake valves, a separate fuel-metering orifice opening into each of said intake ducts, means for supplying fuel under continuous pressure to each of said orifices so that fuel flows continuously therethrough into each of said intake ducts and there accumulates until the opening of the intake valve to which that duct leads and is then carried through that valve by the air flowing through that duct, whereby individually metered quantities of fuel are supplied into each combustion chamber at each opening of its intake valve, and means for varying said pressure to control the power output of the engine.

References Cited in the file of this patent

UNITED STATES PATENTS

| | | |
|---|---|---|
| 2,184,357 | Mallory | Dec. 26, 1939 |
| 2,199,706 | Mallory | May 7, 1940 |
| 2,690,741 | Bioderson | Oct. 5, 1954 |